(12) United States Patent
Gregov et al.

(10) Patent No.: US 9,930,415 B2
(45) Date of Patent: *Mar. 27, 2018

(54) SYNCHRONIZING VIDEO CONTENT WITH EXTRINSIC DATA

(71) Applicant: IMDb.com, Inc., Seattle, WA (US)

(72) Inventors: Andrej Gregov, Seattle, WA (US); Francis J. Kane, Sammamish, WA (US); Douglas M. Treder, Seattle, WA (US)

(73) Assignee: IMDB.COM, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,233

(22) Filed: May 13, 2016

(65) Prior Publication Data

US 2016/0255402 A1 Sep. 1, 2016

Related U.S. Application Data

(63) Continuation of application No. 14/225,864, filed on Mar. 26, 2014, now Pat. No. 9,357,267, which is a
(Continued)

(51) Int. Cl.
*H04N 21/472* (2011.01)
*H04N 21/4725* (2011.01)
(Continued)

(52) U.S. Cl.
CPC ......... *H04N 21/4725* (2013.01); *G06Q 90/00* (2013.01); *H04N 21/235* (2013.01);
(Continued)

(58) Field of Classification Search
None
See application file for complete search history.

(56) References Cited

U.S. PATENT DOCUMENTS 5,260,556 A 11/1993 Lake et al.
5,596,705 A 1/1997 Reimer et al.
(Continued)

FOREIGN PATENT DOCUMENTS

EP 1993282 11/2008
EP 2071578 6/2009
(Continued)

OTHER PUBLICATIONS

U.S. Appl. No. 14/225,864, filed Mar. 26, 2014, Final Office Action dated Jul. 13, 2015.
(Continued)

*Primary Examiner* — Mulugeta Mengesha
*Assistant Examiner* — Charles N Hicks
(74) *Attorney, Agent, or Firm* — Thomas | Horstemeyer, LLP

(57) ABSTRACT

Disclosed are various embodiments for associating and synchronizing extrinsic data with video content at particular points of time in the video content. In one embodiment, a user interface is rendered that facilitates an entry of a corresponding score for at least one of a plurality of extrinsic data items that are associated with a video content feature that is currently being presented to a first user. The corresponding score of a particular extrinsic data item of the plurality of extrinsic data items is received through the user interface. A time in the video content feature that is currently being presented to the first user is determined. The particular extrinsic data item is rendered on an electronic display at the time during another presentation of the video content feature to a second user based at least in part on the corresponding score.

20 Claims, 10 Drawing Sheets

Related U.S. Application Data continuation of application No. 13/227,097, filed on Sep. 7, 2011, now Pat. No. 8,689,255.

(51) Int. Cl.

| | |
|---|---|
| *H04N 21/4722* | (2011.01) |
| *G06Q 90/00* | (2006.01) |
| *H04N 21/235* | (2011.01) |
| *H04N 21/258* | (2011.01) |
| *H04N 21/654* | (2011.01) |
| *H04N 21/6587* | (2011.01) |
| *H04N 21/81* | (2011.01) |
| *H04N 21/84* | (2011.01) |
| *H04N 21/8547* | (2011.01) |
| *H04N 21/41* | (2011.01) |
| *H04N 21/43* | (2011.01) |
| *H04N 21/431* | (2011.01) |
| *H04N 21/439* | (2011.01) |
| *H04N 21/44* | (2011.01) |
| *H04N 21/442* | (2011.01) |
| *H04N 21/45* | (2011.01) |
| *H04N 21/475* | (2011.01) |
| *H04N 21/443* | (2011.01) |

(52) U.S. Cl.
CPC . *H04N 21/25866* (2013.01); *H04N 21/25891* (2013.01); *H04N 21/4126* (2013.01); *H04N 21/4307* (2013.01); *H04N 21/4316* (2013.01); *H04N 21/4394* (2013.01); *H04N 21/44008* (2013.01); *H04N 21/44204* (2013.01); *H04N 21/4532* (2013.01); *H04N 21/4722* (2013.01); *H04N 21/4756* (2013.01); *H04N 21/654* (2013.01); *H04N 21/6587* (2013.01); *H04N 21/8133* (2013.01); *H04N 21/84* (2013.01); *H04N 21/8547* (2013.01); *H04N 21/4431* (2013.01)

(56) References Cited

U.S. PATENT DOCUMENTS

| | | | |
|---|---|---|---|
| 5,691,527 A | | 11/1997 | Hara et al. |
| 5,692,212 A | | 11/1997 | Roach |
| 5,781,730 A | | 7/1998 | Reimer et al. |
| 6,065,042 A | | 5/2000 | Reimer et al. |
| 6,556,722 B1 | | 4/2003 | Russell et al. |
| 7,103,541 B2 | | 9/2006 | Attias et al. |
| 7,293,275 B1 | * | 11/2007 | Krieger .............. H04N 5/44543 |
| | | | 348/E5.105 |
| 7,558,865 B2 | | 7/2009 | Lin et al. |
| 7,774,075 B2 | | 8/2010 | Lin |
| 7,814,521 B2 | | 10/2010 | Ou et al. |
| 8,161,082 B2 | | 4/2012 | Israel et al. |
| 8,209,396 B1 | | 6/2012 | Raman et al. |
| 8,250,605 B2 | | 8/2012 | Opaluch |
| 8,365,235 B2 | | 1/2013 | Hunt et al. |
| 8,510,775 B2 | | 8/2013 | Lafreniere et al. |
| 8,552,983 B2 | | 10/2013 | Chiu |
| 8,644,702 B1 | | 2/2014 | Kalajan |
| 8,689,255 B1 | | 4/2014 | Gregov et al. |
| 8,763,041 B2 | | 6/2014 | Timmermann et al. |
| 8,849,943 B2 | | 9/2014 | Huang et al. |
| 8,955,021 B1 | | 2/2015 | Treder et al. |
| 9,078,030 B2 | | 7/2015 | Kuo |
| 9,113,128 B1 | | 8/2015 | Aliverti et al. |
| 9,241,187 B2 | | 1/2016 | Ricci |
| 2002/0042920 A1 | | 4/2002 | Thomas et al. |
| 2002/0059610 A1 | | 5/2002 | Ellis |
| 2003/0050863 A1 | * | 3/2003 | Radwin .................. G06Q 30/02 |
| | | | 705/26.1 |
| 2004/0028258 A1 | | 2/2004 | Naimark et al. |
| 2004/0056097 A1 | | 3/2004 | Walmsley et al. |
| 2004/0133919 A1 | | 7/2004 | Incentis |
| 2004/0197088 A1 | | 10/2004 | Ferman et al. |
| 2005/0160465 A1 | * | 7/2005 | Walker ................... H04N 5/76 |
| | | | 725/86 |
| 2005/0177538 A1 | | 8/2005 | Shimizu et al. |
| 2005/0264527 A1 | | 12/2005 | Lin |
| 2006/0007452 A1 | | 1/2006 | Gaspard et al. |
| 2006/0184538 A1 | | 8/2006 | Randall et al. |
| 2006/0271836 A1 | | 11/2006 | Morford et al. |
| 2006/0278722 A1 | | 12/2006 | Tominaga |
| 2007/0061724 A1 | | 3/2007 | Slothouber et al. |
| 2007/0143737 A1 | | 6/2007 | Huang et al. |
| 2008/0002021 A1 | | 1/2008 | Guo et al. |
| 2008/0005222 A1 | | 1/2008 | Lambert et al. |
| 2008/0066135 A1 | | 3/2008 | Brodersen et al. |
| 2008/0148317 A1 | | 6/2008 | Opaluch |
| 2008/0172293 A1 | | 7/2008 | Raskin et al. |
| 2008/0196072 A1 | | 8/2008 | Chun |
| 2008/0209465 A1 | | 8/2008 | Thomas et al. |
| 2008/0235749 A1 | | 9/2008 | Jain et al. |
| 2008/0271068 A1 | | 10/2008 | Ou et al. |
| 2009/0018898 A1 | | 1/2009 | Genen |
| 2009/0019009 A1 | | 1/2009 | Byers |
| 2009/0081950 A1 | | 3/2009 | Matsubara et al. |
| 2009/0089186 A1 | | 4/2009 | Paolini |
| 2009/0090786 A1 | | 4/2009 | Hovis |
| 2009/0094113 A1 | | 4/2009 | Berry et al. |
| 2009/0138906 A1 | | 5/2009 | Eide et al. |
| 2009/0199098 A1 | | 8/2009 | Kweon et al. |
| 2010/0153831 A1 | | 1/2010 | Beaton |
| 2010/0057782 A1 | | 3/2010 | McGowan et al. |
| 2010/0092079 A1 | | 4/2010 | Aller |
| 2010/0103106 A1 | | 4/2010 | Chiu Hsien-Hsiang |
| 2010/0154007 A1 | | 6/2010 | Touboul et al. |
| 2010/0199219 A1 | | 8/2010 | Poniatowski et al. |
| 2010/0222102 A1 | | 9/2010 | Rodriguez |
| 2010/0251292 A1 | | 9/2010 | Srinivasan et al. |
| 2010/0287592 A1 | | 11/2010 | Patten et al. |
| 2010/0312596 A1 | | 12/2010 | Saffari et al. |
| 2011/0023073 A1 | | 1/2011 | McCarthy et al. |
| 2011/0047299 A1 | | 2/2011 | Yu et al. |
| 2011/0049250 A1 | | 3/2011 | Hovis et al. |
| 2011/0067061 A1 | | 3/2011 | Karaoguz et al. |
| 2011/0162007 A1 | | 6/2011 | Karaoguz et al. |
| 2011/0167456 A1 | | 7/2011 | Kokenos et al. |
| 2011/0173659 A1 | | 7/2011 | Lafreniere et al. |
| 2011/0181780 A1 | | 7/2011 | Barton |
| 2011/0246295 A1 | | 10/2011 | Kejariwal et al. |
| 2011/0246495 A1 | | 10/2011 | Mallinson |
| 2011/0282906 A1 | | 11/2011 | Wong |
| 2011/0289534 A1 | | 11/2011 | Jordan et al. |
| 2011/0296465 A1 | | 12/2011 | Krishnan et al. |
| 2012/0014663 A1 | | 1/2012 | Knight et al. |
| 2012/0072953 A1 | | 3/2012 | James et al. |
| 2012/0096499 A1 | | 4/2012 | Dasher et al. |
| 2012/0151530 A1 | | 6/2012 | Krieger et al. |
| 2012/0220223 A1 | | 8/2012 | Rose et al. |
| 2012/0238363 A1 | | 9/2012 | Watanabe et al. |
| 2012/0240161 A1 | | 9/2012 | Kuo |
| 2012/0256000 A1 | | 10/2012 | Cok |
| 2012/0256007 A1 | | 10/2012 | Cok |
| 2012/0308202 A1 | | 12/2012 | Murata et al. |
| 2013/0014155 A1 | | 1/2013 | Clarke et al. |
| 2013/0021535 A1 | | 1/2013 | Kim et al. |
| 2013/0024783 A1 | | 1/2013 | Brakensiek et al. |
| 2013/0057543 A1 | | 3/2013 | Mann et al. |
| 2013/0060660 A1 | | 3/2013 | Maskatia et al. |
| 2013/0094013 A1 | | 4/2013 | Hovis et al. |
| 2013/0110672 A1 | | 5/2013 | Yang et al. |
| 2013/0113993 A1 | | 5/2013 | Dagit, III |
| 2013/0144727 A1 | | 6/2013 | Morot-Gaudry et al. |
| 2013/0219434 A1 | | 8/2013 | Farrell et al. |
| 2013/0291018 A1 | | 10/2013 | Billings et al. |
| 2013/0339991 A1 | | 12/2013 | Ricci |
| 2014/0035726 A1 | | 2/2014 | Schoner et al. |
| 2014/0035913 A1 | | 2/2014 | Higgins et al. |
| 2014/0043332 A1 | | 2/2014 | Rollett |
| 2014/0068670 A1 | | 3/2014 | Timmermann et al. |
| 2014/0122564 A1 | | 5/2014 | Arora et al. |

(56) References Cited

U.S. PATENT DOCUMENTS

| | | | |
|---|---|---|---|
| 2014/0130102 | A1 | 5/2014 | Iijima et al. |
| 2014/0134947 | A1 | 5/2014 | Stouder-Studenmund |
| 2014/0208355 | A1 | 7/2014 | Gregov et al. |
| 2014/0281985 | A1 | 9/2014 | Garrison et al. |
| 2015/0095774 | A1 | 4/2015 | Bates et al. |
| 2015/0156562 | A1 | 6/2015 | Treder et al. |
| 2015/0195474 | A1 | 7/2015 | Lu |
| 2015/0339508 | A1 | 11/2015 | Hosokane |
| 2015/0357001 | A1 | 12/2015 | Aliverti et al. |

FOREIGN PATENT DOCUMENTS

| | | |
|---|---|---|
| WO | 2003084229 | 10/2003 |
| WO | WO2003084229 | 10/2003 |
| WO | 2014036413 | 3/2014 |

OTHER PUBLICATIONS

U.S. Appl. No. 14/225,864, filed Mar. 26, 2014, Response to Non-Final Office Action dated Mar. 3, 2015.
U.S. Appl. No. 14/225,864, filed Mar. 26, 2014, Non-Final Office Action dated Mar. 3, 2015.
U.S. Appl. No. 13/227,097, filed Sep. 7, 2011, Notice of Allowance dated Oct. 22, 2013.
U.S. Appl. No. 13/227,097, filed Sep. 7, 2011, Response to Non-Final Office Action dated Apr. 9, 2013.
U.S. Appl. No. 13/227,097, filed Sep. 7, 2011, Non-Final Office Action dated Apr. 9, 2013.
U.S. Appl. No. 14/826,508, filed Aug. 14, 2015, Response to Non-Final Office Action dated Oct. 26, 2016.
U.S. Appl. No. 14/826,508, filed Aug. 14, 2015, Non-Final Office Action dated Oct. 26, 2016.
U.S. Appl. No. 13/927,970 entitled "Providing Soundtrack Information During Playback of Video Content" filed Jun. 26, 2013.
U.S. Appl. No. 13/709,768 entitled "Providing Content Via Multiple Display Devices" filed Dec. 10, 2012.
U.S. Appl. No. 13/778,846 entitled "Shopping Experience Using Multiple Computing Devices" filed Feb. 27, 2013.
U.S. Appl. No. 14/034,055 entitled "Playback of Content Using Multiple Devices" filed Sep. 23, 2013.
"Entertainment is more amazing with Xbox SmartGlass," Xbox SmartGlass 1 Companion Application—Xbox.com, retrieved from "http://www.xbox.com/en-US/smartglass," retrieved Dec. 4, 2012.
"Wii U GamePad," Wii U Official Site—Features, retrieved from "http://www.nintendo.com/wiiu/features/," retrieved Dec. 4, 2012.
"TVPlus for the iPad," iTunes Store, retrieved from "http://itunes.apple.com/us/app/tvplus/id444774882?mt=B," updated Apr. 13, 2012.
International Searching Authority and Written Opinion dated Mar. 21, 2014 for PCT/US2013/057543 filed Aug. 30, 2013.
"Sony Pictures to smarten up Blu-ray with MovieiQ, the 'killer app for Bd-Live,'" Engadget, retrieved from http://www.engadget.com/2009/06/18/sony-pictures-to-smarten-up-blu-ray-with-movieiq-the-killer-ap/, Jun. 18, 2009.
"Hulu 'Face Match' feature attaches an actor's entire history to their mug," Engadget, retrieved from http://www.engadget. com/20 11/12/08/hulu-face-match-feature-attaches-an-actors-entire-h istory-to/, Dec. 8, 2011.
Canadian Patent Application CA2,882,899, Office Action dated Apr. 6, 2016.
European Patent Application EP13832505.5, Extended European Search Report dated Mar. 15, 2016.
ISO/IEC 18004:2006. Information technology—Automatic identification and data capture techniques—QR Code 2005 bar code symbology specification. International Organization for Standardization, Geneva, Switzerland.
U.S. Appl. No. 14/218,408, filed Mar. 18, 2014, Final Office Action dated Nov. 25, 2016.
U.S. Appl. No. 14/218,408, filed Mar. 18, 2014, Response to Non-Final Office Action dated Apr. 11, 2016.
U.S. Appl. No. 14/218,408, filed Mar. 18, 2014, Non-Final Office Action dated Apr. 11, 2016.
U.S. Appl. No. 14/218,408, filed Mar. 18, 2014, Response to Final Office Action dated Jul. 27, 2015.
U.S. Appl. No. 14/218,408, filed Mar. 18, 2014, Final Office Action dated Jul. 27, 2015.
U.S. Appl. No. 14/218,408, filed Mar. 18, 2014, Response to Non-Final Office Action dated Feb. 12, 2015.
U.S. Appl. No. 14/218,408, filed Mar. 18, 2014, Non-Final Office Action dated Feb. 12, 2015.
U.S. Appl. No. 13/778,846, filed Feb. 27, 2013, Response to Final Office Action dated Jul. 29, 2016.
U.S. Appl. No. 13/778,846, filed Feb. 27, 2013, Final Office Action dated Jul. 29, 2016.
U.S. Appl. No. 13/778,846, filed Feb. 27, 2013, Response to Non-Final Office Action dated Jan. 20, 2016.
U.S. Appl. No. 13/778,846, filed Feb. 27, 2013, Non-Final Office Action dated Jan. 20, 2016.
U.S. Appl. No. 13/927,970, filed Jun. 26, 2013, Response to Restriction/Election dated Oct. 5, 2016.
U.S. Appl. No. 13/927,970, filed Jun. 26, 2013, Restriction/Election dated Oct. 5, 2016.
U.S. Appl. No. 14/034,055, filed Sep. 23, 2013, Response to Final Office Action dated Jul. 29, 2016.
U.S. Appl. No. 14/034,055, filed Sep. 23, 2013, Final Office Action dated Jul. 29, 2016.
U.S. Appl. No. 14/034,055, filed Sep. 23, 2013, Response to Non-Final Office Action dated Apr. 7, 2016.
U.S. Appl. No. 14/034,055, filed Sep. 23, 2013, Non-Final Office Action dated Apr. 7, 2016.
U.S. Appl. No. 14/034,055, filed Sep. 23, 2013, Response to Final Office Action dated Jan. 6, 2016.
U.S. Appl. No. 14/034,055, filed Sep. 23, 2013, Final Office Action dated Jan. 6, 2016.
U.S. Appl. No. 14/034,055, filed Sep. 23, 2013, Response to Non-Final Office Action dated Aug. 3, 2015.
U.S. Appl. No. 14/034,055, filed Sep. 23, 2013, Non-Final Office Action dated Aug. 3, 2015.
U.S. Appl. No. 14/493,970, filed Sep. 23, 2014, Response to Non-Final Office Action dated Jul. 29, 2016.
U.S. Appl. No. 14/493,970, filed Sep. 23, 2014, Non-Final Office Action dated Jul. 29, 2016.
U.S. Appl. No. 14/615,950, filed Feb. 6, 2015, Final Office Action dated Dec. 1, 2016.
U.S. Appl. No. 14/615,950, filed Feb. 6, 2015, Response to Non-Final Office Action dated May 26, 2016.
U.S. Appl. No. 14/615,950, filed Feb. 6, 2015, Non-Final Office Action dated May 26, 2016.
U.S. Appl. No. 14/615,950, filed Feb. 6, 2015, Response to Election/Restriction dated Feb. 10, 2016.
U.S. Appl. No. 14/615,950, filed Feb. 6, 2015, Restriction/Election dated Feb. 10, 2016.
U.S. Appl. No. 13/601,210, filed Aug. 31, 2012, Notice of Allowance dated Sep. 23, 2014.
U.S. Appl. No. 13/601,210, filed Aug. 31, 2012, Response to Final Office Action dated Jan. 2, 2014.
U.S. Appl. No. 13/601,210, filed Aug. 31, 2012, Final Office Action dated Jan. 2, 2014.
U.S. Appl. No. 13/601,210, filed Aug. 31, 2012, Response to Non-Final Office Action dated Aug. 1, 2013.
U.S. Appl. No. 13/601,210, filed Aug. 31, 2012, Non-Final Office Action dated Aug. 1, 2013.
U.S. Appl. No. 13/601,235, filed Aug. 31, 2012, Notice of Allowance dated Mar. 27, 2015.
U.S. Appl. No. 13/601,235, filed Aug. 31, 2012, Response to Non-Final Office Action dated Sep. 11, 2014.
U.S. Appl. No. 13/601,235, filed Aug. 31, 2012, Non-Final Office Action dated Sep. 11, 2014.
U.S. Appl. No. 13/601,267, filed Aug. 31, 2012, Notice of Allowance dated Jan. 21, 2014.

(56) References Cited

OTHER PUBLICATIONS

U.S. Appl. No. 13/601,267, filed Aug. 31, 2012, Response to Non-Final Office Action dated Aug. 14, 2013.
U.S. Appl. No. 13/601,267, filed Aug. 31, 2012, Non-Final Office Action dated Aug. 14, 2013.
U.S. Appl. No. 13/709,768, filed Dec. 10, 2012, Notice of Allowance dated Mar. 17, 2016.
U.S. Appl. No. 13/709,768, filed Dec. 10, 2012, Response to Final Office Action dated Oct. 23, 2015.
U.S. Appl. No. 13/709,768, filed Dec. 10, 2012, Final Office Action dated Oct. 23, 2015.
U.S. Appl. No. 13/709,768, filed Dec. 10, 2012, Response to Non-Final Office Action dated Apr. 21, 2015.
U.S. Appl. No. 13/709,768, filed Dec. 10, 2012, Non-Final Office Action dated Apr. 21, 2015.
U.S. Appl. No. 13/709,768, filed Dec. 10, 2012, Response to Non-Final Office Action dated Oct. 3, 2014.
U.S. Appl. No. 13/709,768, filed Dec. 10, 2012, Non-Final Office Action dated Oct. 3, 2014.
U.S. Appl. No. 14/225,864, filed Mar. 26, 2014, Response to Final Office Action dated Jul. 13, 2015.
Canadian Patent Application CA2, 882,899, Office Action dated Mar. 30, 2017.
U.S. Appl. No. 14/218,408, filed Mar. 18, 2014, Non-final Office Action dated Mar. 30, 2017.
U.S. Appl. No. 14/218,408, filed Mar. 18, 2014, Response to Final Office Action dated Nov. 25, 2016.
U.S. Appl. No. 14/034,055, filed Sep. 23, 2013, Examiner's Answer dated May 24, 2017.
U.S. Appl. No. 13/927,970, filed Jun. 26, 2013, Response to Non-Final Office Action dated Apr. 3, 2017.
U.S. Appl. No. 13/927,970, filed Jun. 26, 2013, Non-Final Office Action dated Apr. 3, 2017.
U.S. Appl. No. 14/493,970, filed Sep. 23, 2014, Non-Final Office Action dated Jun. 6, 2017.
U.S. Appl. No. 14/493,970, filed Sep. 23, 2014, Response to Final Office Action dated Feb. 10, 2017.
U.S. Appl. No. 14/493,970, filed Sep. 23, 2014, Final Office Action dated Feb. 10, 2017.
U.S. Appl. No. 14/826,508, filed Aug. 14, 2015, Notice of Allowance dated Apr. 27, 2017.
U.S. Appl. No. 14/615,950, filed Feb. 6, 2015, Non-Final Office Action dated May 5, 2017.
U.S. Appl. No. 14/615,950, filed Feb. 6, 2015, Response to Final Office Action dated Dec. 1, 2016.
U.S. Appl. No. 13/778,846, filed Feb. 27, 2013, Non-Final Office Action dated Jun. 5, 2017.

\* cited by examiner

SYNCHRONIZING VIDEO CONTENT WITH EXTRINSIC DATA

CROSS-REFERENCE TO RELATED APPLICATIONS

This application is a continuation of, and claims priority to, co-pending U.S. patent application entitled "SYNCHRONIZING VIDEO CONTENT WITH EXTRINSIC DATA," filed on Mar. 26, 2014, and assigned application Ser. No. 14/225,864, which is a continuation of, and claims priority to, co-pending U.S. patent application entitled "SYNCHRONIZING VIDEO CONTENT WITH EXTRINSIC DATA," filed on Sep. 7, 2011, and assigned application Ser. No. 13/227,097, which issued as U.S. Pat. No. 8,689,255 on Apr. 1, 2014, both of which are incorporated herein by reference in their entirety.

BACKGROUND

People often want more information about the movies and other video content they are watching. To this end, people may search the Internet to find out more information about the video content. This information may include, for example, biographies of actors, production information, trivia, goofs, and so on.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to associating and synchronizing extrinsic data with video content. Consumers of video content such as movies, television shows, etc. often would like additional information about what they are seeing. The additional information may relate to trivia, mistakes, or further information about what is currently being shown such as actors appearing on screen and/or other information. The additional information may involve biographies, filmographies, pictures, audio clips, video clips, and/or other forms of rich content. The additional information, referred to herein as extrinsic data, may be available in a database that may be accessed through a web site. However, the extrinsic data may not be associated with any specific time in the movie, making it difficult to locate extrinsic data that is relevant to what is currently being shown.

Various embodiments of the present disclosure facilitate associating extrinsic data items with video content features at specific times. In some embodiments, the associations may be crowd-sourced and then validated through various approaches. Once obtained, extrinsic data items may be displayed in conjunction with the video content feature so that their appearance is synchronized according to the stored, validated extrinsic data-time associations. User interfaces for obtaining the associations and presenting the extrinsic data items may be displayed along with the video content within a single client device. Alternatively, the user interfaces may be rendered in a different client device from a device that is presenting the video content. In the following discussion, a general description of the system and its components is provided, followed by a discussion of the operation of the same.

Figure 1:
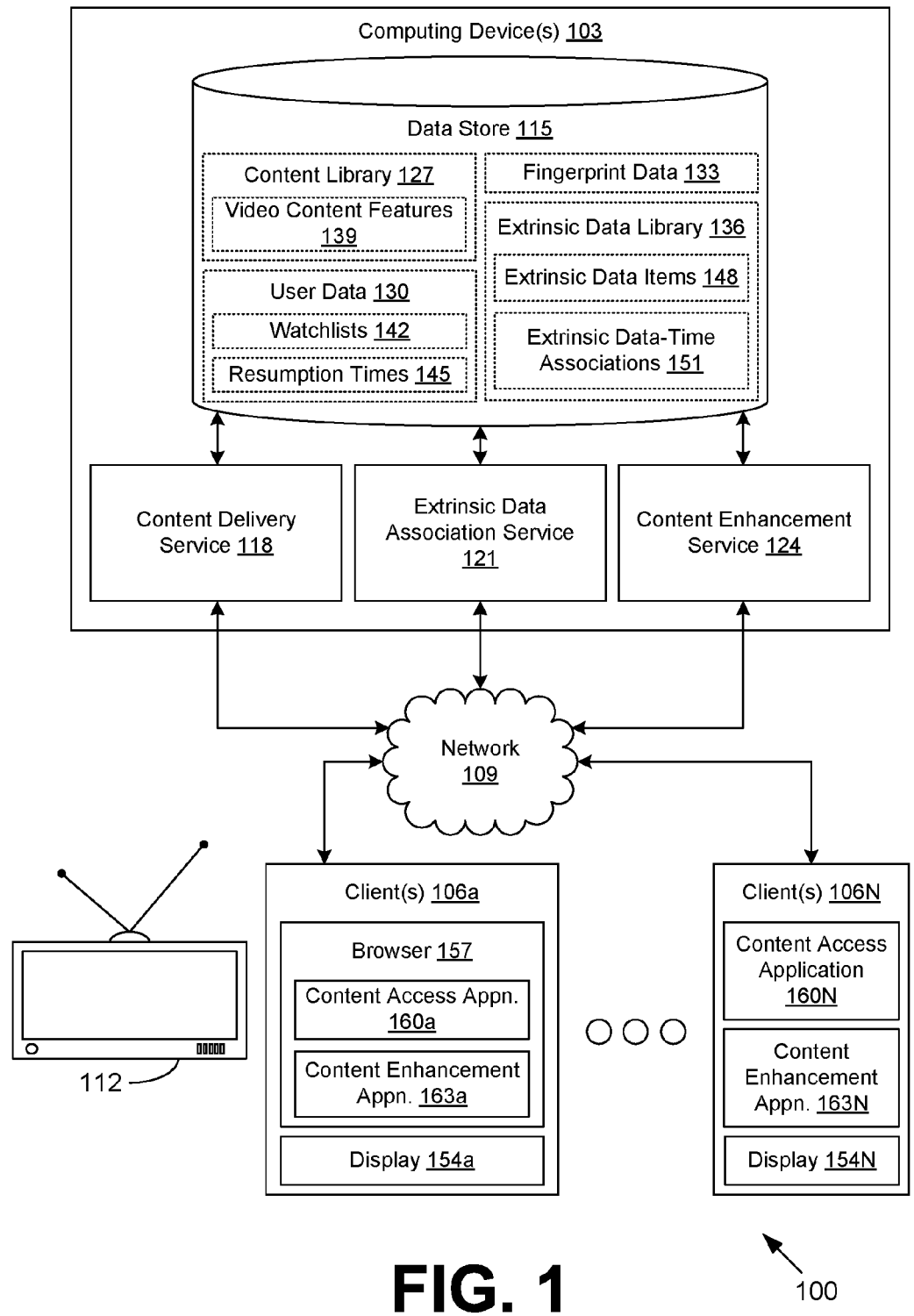
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with a plurality of clients 106a . . . 106N by way of a network 109. The network 109 includes, for example, the Internet, intranets, extranets, wide area networks (WANs), local area networks (LANs), wired networks, wireless networks, or other suitable networks, etc., or any combination of two or more such networks. The networked environment 100 may also include one or more content display devices 112 such as televisions, video projectors, and so on, which may or may not be coupled to the network 109. In one embodiment, one or more of the clients 106 may be in data communication with the content display device 112 by way of another local network (e.g., Bluetooth, infrared, Wi-Fi, etc.) that may be separate from the network 109.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include a content delivery service 118, an extrinsic data association service 121, a content enhancement service 124, and other applications, services, processes, systems, engines, or functionality not discussed in detail herein. The content delivery service 118 is executed to serve up or stream video content to clients 106 and/or client display devices 112. The content delivery service 118 may support a resume functionality such that playback of video content may be stopped at a point in the video content on one device and later resumed at that point on the same device or a different device.

The extrinsic data association service 121 is executed to facilitate the association of extrinsic data with particular times within video content. To this end, the extrinsic data association service 121 may generate data for a user interface that presents various options for extrinsic data to a user. From the options, the user may select one or more extrinsic data items to associate with a particular time in the playback of the video content. The extrinsic data association service 121 may be configured to validate the user-supplied association through various approaches as will be described.

The content enhancement service 124 is executed to present extrinsic data items in synchronization with video content according to stored associations of the extrinsic data with the video content. To this end, the content enhancement service 124 may determine the time in the video content as it is being presented to the user and obtain extrinsic data items associated with the video content relative to that time. The extrinsic data items may be presented on a distinct display, alongside the video content, overlaid on top of the video content, or in some other manner in conjunction with the video content.

The data stored in the data store 115 includes, for example, a content library 127, user data 130, fingerprint data 133, an extrinsic data library 136, and potentially other data. The content library 127 may include multiple video content features 139 such as movies, television shows, video clips, and/or other forms of video content. It is noted that the content library 127 may be absent in some embodiments as the computing device 103 may maintain the extrinsic data and video content associations and not actually present the content.

The user data 130 includes various data associated with users of the system. The user data 130 may include one or more watchlists 142 that indicate video content features 139 that the users are interested in watching. The user data 130 may also include one or more resumption times 145, which correspond to times in video content features 139 at which the video content feature 139 was paused or stopped. In one embodiment, the user data 130 may indicate a reputation or feedback score for the user that may be employed in assessing the validity of extrinsic data associations created by the users.

The fingerprint data 133 may include, for example, audio fingerprinting data and/or video fingerprinting data that may be employed in some embodiments to identify video content features 139 that are being presented to users and/or to identify times, dialogue, or scenes within the video content features 139. The fingerprint data 133 may include script information that may be used to identify times in video content features 139 from subtitles or recognized audio. Although the fingerprint data 133 is depicted as being within the data store 115, in some embodiments portions of the fingerprint data 133 may be stored within the clients 106 to facilitate identification of video content features 139 or times in the video content feature 139.

The extrinsic data library 136 includes extrinsic data items 148 that are associated with the video content features 139. The extrinsic data items 148 may correspond to metadata about the video content features 139 that is not obtained directly from the video content features 139. In other words, the extrinsic data items 148 may be obtained from an external source, such as a source of curated data. This is in contrast to intrinsic data, which may be obtained from the video or audio of video content features 139. Non-limiting examples of the extrinsic data items 148 may include names or descriptions of performers in the video content features 139, biographies or filmographies of the performers, commentary, trivia, mistakes, user comments, images, and/or other data. The extrinsic data items 148 may include curated data that is professionally managed, verified, or is otherwise trustworthy.

Stored along with the extrinsic data items 148 may be extrinsic data-time associations 151. The extrinsic data-time associations 151 are user-generated associations between extrinsic data items 148 and specific times in the running of a video content feature 139. In some embodiments, the time may be represented as a frame number, or a range of frame numbers, in the video content feature 139. The extrinsic data-time associations 151 may also indicate an association of extrinsic data items 148 with a specific graphical position on one or more video frames of the video content feature 139.

As an example, the extrinsic data-time associations 151 may indicate which performers appear on screen at a point fifteen minutes into the running of a video content feature 139. As another example, the extrinsic data-time associations 151 may indicate that a certain goof or mistake is associated with a point 45 minutes and twenty seconds into the running of a video content feature 139. In various embodiments, the user-generated extrinsic data-time associations 151 may undergo a validating procedure before they are considered valid.

The clients 106 are representative of a plurality of client devices that may be coupled to the network 109. Each client 106 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, web pads, tablet computer systems, game consoles, electronic book readers, or other devices with like capability. Each client 106 may include a respective display 154a . . . 154N. The display 154 may comprise, for example, one or more devices such as cathode ray tubes (CRTs), liquid crystal display (LCD) screens, gas plasma-based flat panel displays, LCD projectors, or other types of display devices, etc.

Each client 106 may be configured to execute various applications such as a browser 157, a respective content access application 160a . . . 160N, a respective content enhancement application 163a . . . 163N, and/or other applications. The browser 157 may be executed in a client 106, for example, to access and render network pages, such as web pages, or other network content served up by the computing device 103 and/or other servers. The content access application 160 is executed to obtain and render for display video content features 139 from the content delivery service 118, other servers, and/or local storage media. The content enhancement application 163 is executed to facilitate user-generation of extrinsic data-time associations 151 as well as to present extrinsic data items 148 in synchronization with the video content features 139.

In some embodiments, the content access application 160 and/or the content enhancement application 163 may correspond to code that is executed in the browser 157 or plug-ins to the browser 157. In other embodiments, the content access application 160 and/or the content enhancement application 163 may correspond to standalone applications such as mobile applications. In some scenarios, the content access application 160 and the content enhancement application 163 may be executed on different clients 106 for one user. The client 106 may be configured to execute applications beyond those mentioned above such as, for example, mobile applications, email applications, instant message applications, and/or other applications.

Next, a general description of the operation of the various components of the networked environment 100 is provided. To begin, users at clients 106 access video content features 139 through content display devices 112 or through content access applications 160 executed in clients 106. The video content features 139 accessed through the content display devices 112 may be obtained through multi-channel television, video-on-demand, optical disc, or other media. Where a content access application 160 is employed to access video content features 139, the video content features 139 may be served up by the content delivery service 118, potentially from a watchlist 142 of the user.

The content enhancement application 163 executed in the client 106 is able to track the progress of the video content feature 139 through communication with the content access application 160, content delivery service 118, or the content display device 112. In some embodiments, the content enhancement application 163 may be equipped to recognize video content features 139 presented in the environment of the user via audio and/or video fingerprinting. The video content features 139 may also be identified through subtitle information, program identifier information, and/or other information available from a content display device 112 or a content access application 160. Ultimately, a time in the video content feature 139 is determined. It is noted that a movie or other video content feature 139 may have multiple versions with different running times, so the specific version of the video content feature 139 may be identified.

The extrinsic data association service 121 is configured to send user interface data to the content enhancement application 163 in order to present a user interface for selecting from various extrinsic data items 148. When an extrinsic data item 148 is selected, an association between a time in the video content feature 139 and the extrinsic data item 148 may be reported by the content enhancement application 163 to the extrinsic data association service 121. The extrinsic data association service 121 may record the association as an extrinsic data-time association 151 in the data store 115.

The extrinsic data association service 121 may be configured to validate the user-generated association before it can be presented to other users. In some cases, the validation may depend at least in part on a reputation score associated with the user. In one embodiment, the user-generated association is considered valid if it is not a statistical outlier compared to similar user-generated associations. Under a crowd-sourcing model, many different users may supply similar user-generated associations, which may be used to indicate a valid association if the user-generated associations are generally in agreement. In another embodiment, the user-generated association may be presented to other users to confirm its correctness manually. Whether the user supplies valid associations may affect the reputation score of the user.

It is noted that the extrinsic data-time associations 151 correspond to relatively high quality data despite being user generated. This is in part because the extrinsic data items 148 may already be correlated or associated with the video content features 139. As a non-limiting example, a user would be unable to specify that "Martin Sheen" is an actor in a scene of the movie "Ferris Bueller's Day Off," because there is no existing association between "Martin Sheen" and the movie. However, "Charlie Sheen" is an actor in the movie, and the user would be able to specify that "Charlie Sheen" is in a scene in the movie. Accordingly, the extrinsic data association service 121 preempts potential confusion between "Martin Sheen" and "Charlie Sheen" with respect to "Ferris Bueller's Day Off." Similarly, in another non-limiting example, a user may be unable to specify that "Charlie Chaplin" appears in a movie in 1999 because the extrinsic data library 136 indicates that "Charlie Chaplin" does not appear in any movies after 1967.

When a user views the video content feature 139, the content enhancement application 163 is configured to render the extrinsic data items 148 that are associated with specific times in the video content feature 139. For example, a balloon, box, bar, etc. may be rendered on top of or in conjunction with the video content feature 139 to show extrinsic data items 148 that are relevant to the current time period in the video content feature 139. In one embodiment, the user may be viewing the video content feature 139 on one device and viewing the extrinsic data items 148 on another device. The content enhancement service 124 is configured to send data that implements rendering of the related extrinsic data items 148 to the content enhancement application 163.

Although a specific structure may be described herein that defines the server-side roles (e.g., of the content delivery service 118, the extrinsic data association service 121, and the content enhancement service 124) and client-side roles (e.g., of the content access application 160 and the content enhancement application 163), it is understood that various functions may be performed at the server side or the client side. As a non-limiting example, the identity of the video content feature 139 may be determined in the computing device 103 or in the client 106. Additionally, although various embodiments are described with respect to video content which may include audio content, it is understood that the principles of the present disclosure may also be applied to audio content without a corresponding video component.

Figure 2A:
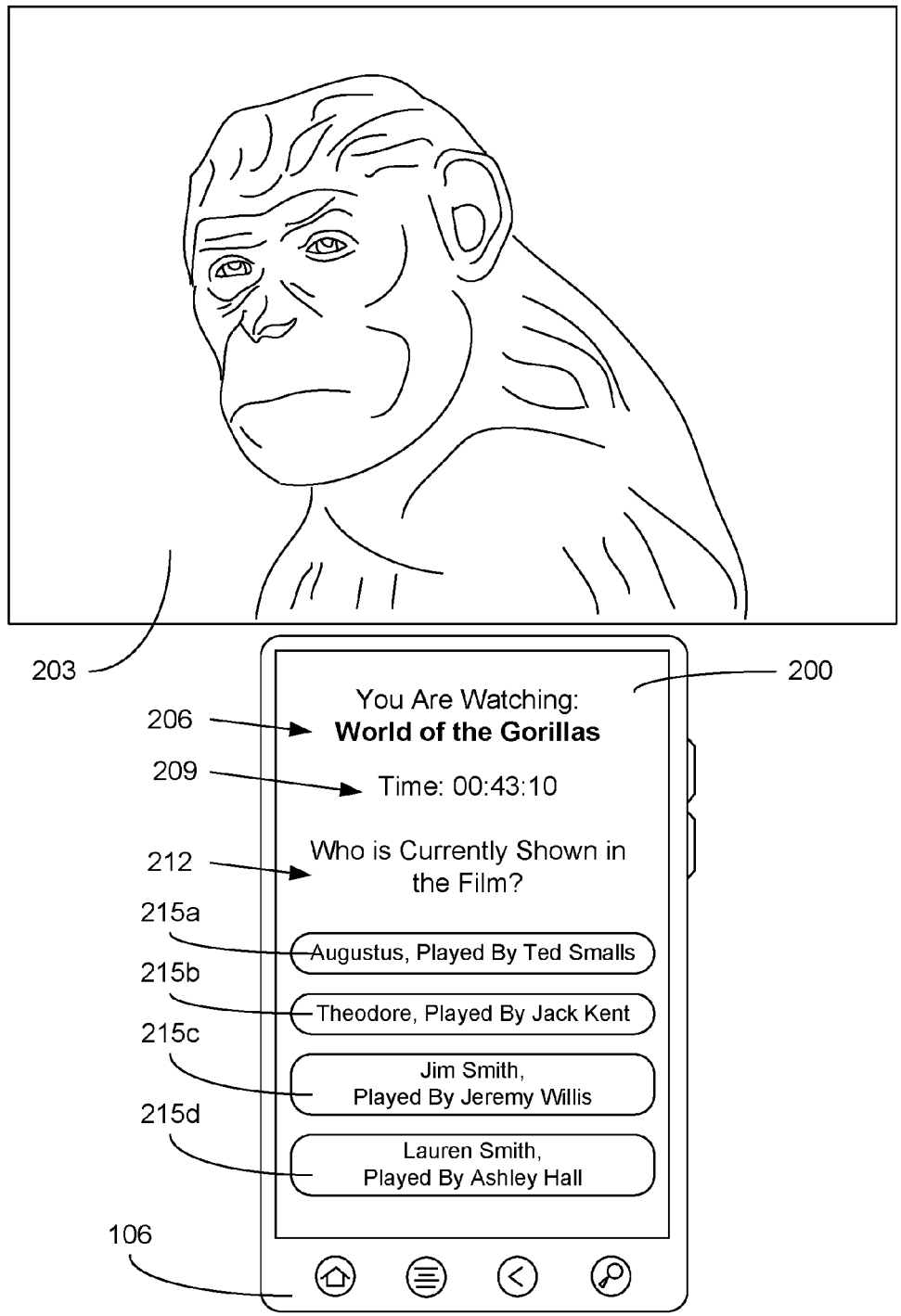
FIGS. 2A-2C are drawings that depict examples of user interfaces rendered by various clients in the networked environment of FIG. 1 according to various embodiments of the present disclosure.

Turning now to FIG. 2A, shown is one example of a client 106 rendering a user interface 200 in connection with a content display 203 of a content display device 112 (FIG. 1) in the networked environment 100 (FIG. 1). In this non-limiting example, the client 106 corresponds to a mobile device such as a smartphone or tablet computer, and the content display device 112 corresponds to a theater projector or a television. A user of the client 106 is currently watching a video content feature 139 (FIG. 1) on the content display device 112. Concurrently, the client 106 executes the content enhancement application 163 (FIG. 1) to render additional information about the video content feature 139 embodied in time-relevant extrinsic data items 148 (FIG. 1).

A title 206 in user interface 200 indicates that the user is currently being presented with a video content feature 139 entitled "World of the Gorillas." The identity of the video content feature 139 may be ascertained through communication with an application programming interface (API) of the content display device 112 (e.g., through a Bluetooth, infrared, or other network). Alternatively, the identity may be ascertained through video or audio fingerprinting analysis performed by the content enhancement application 163 using the fingerprint data 133 (FIG. 1). To this end, the content enhancement application 163 may capture the audio and/or video of the video content feature 139.

The user interface 200 may display the current time 209 in the video content feature 139, which in this example is 43 minutes and 10 seconds. A prompt 212 introduces a plurality of selection options 215a, 215b, 215c, and 215d. The prompt 215 in this example asks the question, "who is currently shown in the film?" The selection options 215a, 215b, 215c, and 215d each correspond to one or more extrinsic data items 148 (FIG. 1) that may be associated with the current time 209 in the video content feature 139. In this example, each selection option 215 indicates a respective performer with corresponding character in the video content feature 139. Although the selection options 215 are shown as selectable buttons, the selection options 215 may be selected through various user interface components. In one embodiment, images associated with the respective selection option 215 (e.g., headshots for the performers, etc.) may also be presented.

Figure 2B:
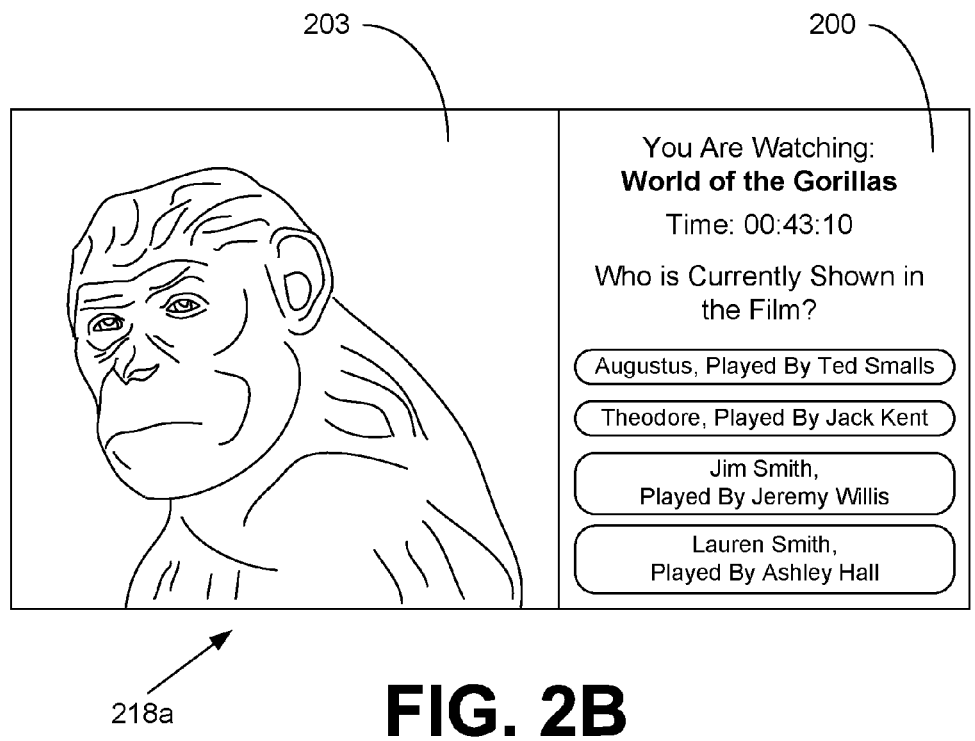

Moving on to FIG. 2B, shown is one example of a screen 218a rendered on a display 154 (FIG. 1) of a client 106 (FIG. 1) in the networked environment 100 (FIG. 1). The screen 218a includes the content display 203 from FIG. 2A, with the user interface 200 of FIG. 2A being rendered alongside, in visual association, with the content display. In this example, the content display 203 is rendered by a content access application 160 (FIG. 1), which is executed in the same client 106 as the content enhancement application 163 (FIG. 1) that renders the user interface 200. Accordingly, the content enhancement application 163 is able to render the user interface 200 on top of, or alongside, the video content feature 139 (FIG. 1). In one embodiment, the user selection may be made by selecting a location on the screen 218a. The location on the video frame of the video content feature 139 may be recorded as part of the selection. This may facilitate showing the associated extrinsic data items 148 (FIG. 1) relative to a specific location on the screen 218a.

Figure 2C:
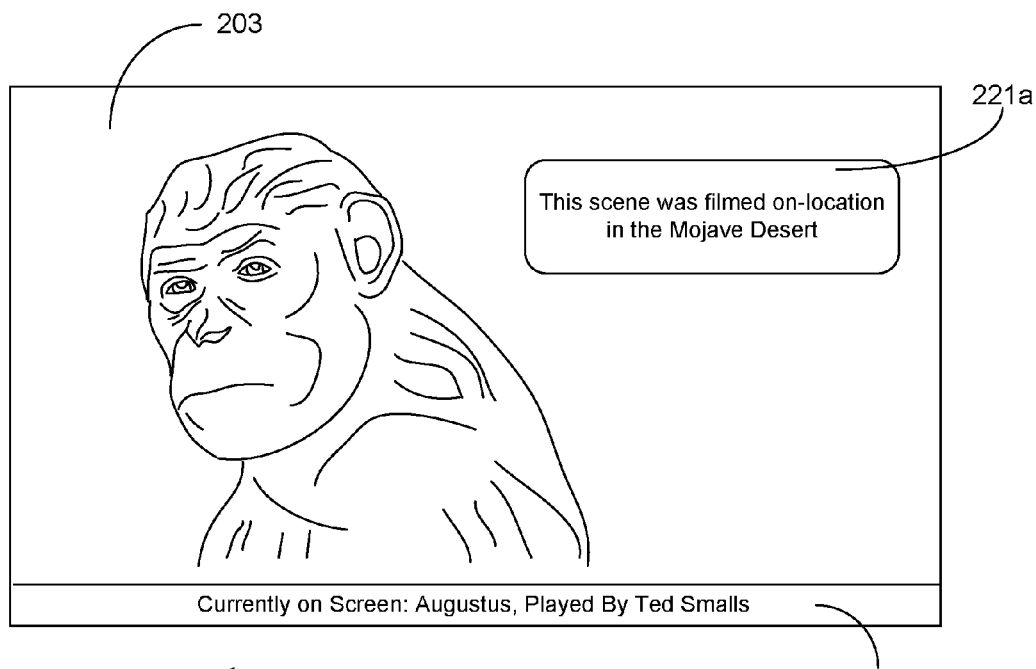

With reference to FIG. 2C, shown is another example of a screen 218b rendered on a display 154 (FIG. 1) of a client 106 (FIG. 1) in the networked environment 100 (FIG. 1). Unlike FIGS. 2A and 2C, the screen 218b presents extrinsic data-time associations instead of obtaining them. To this end, rendered extrinsic data items 221a and 221b are shown superimposed on the screen 218b in visual association with the content display 203.

Rendered extrinsic data item 221a is a trivia item that indicates that the scene that is currently shown was "filmed on location in the Mojave Desert." Rendered extrinsic data item 221b indicates that the character of "Augustus," which is played by "Ted Smalls" is currently on the screen. In various embodiments, the rendered extrinsic data items 221 may include selectable components to obtain and/or display further information (e.g., images, biographies, filmographies, etc. for performers). In some embodiments, the user interface 200 (FIG. 2B) may be shown along with rendered extrinsic data items 221.

Figure 3A:
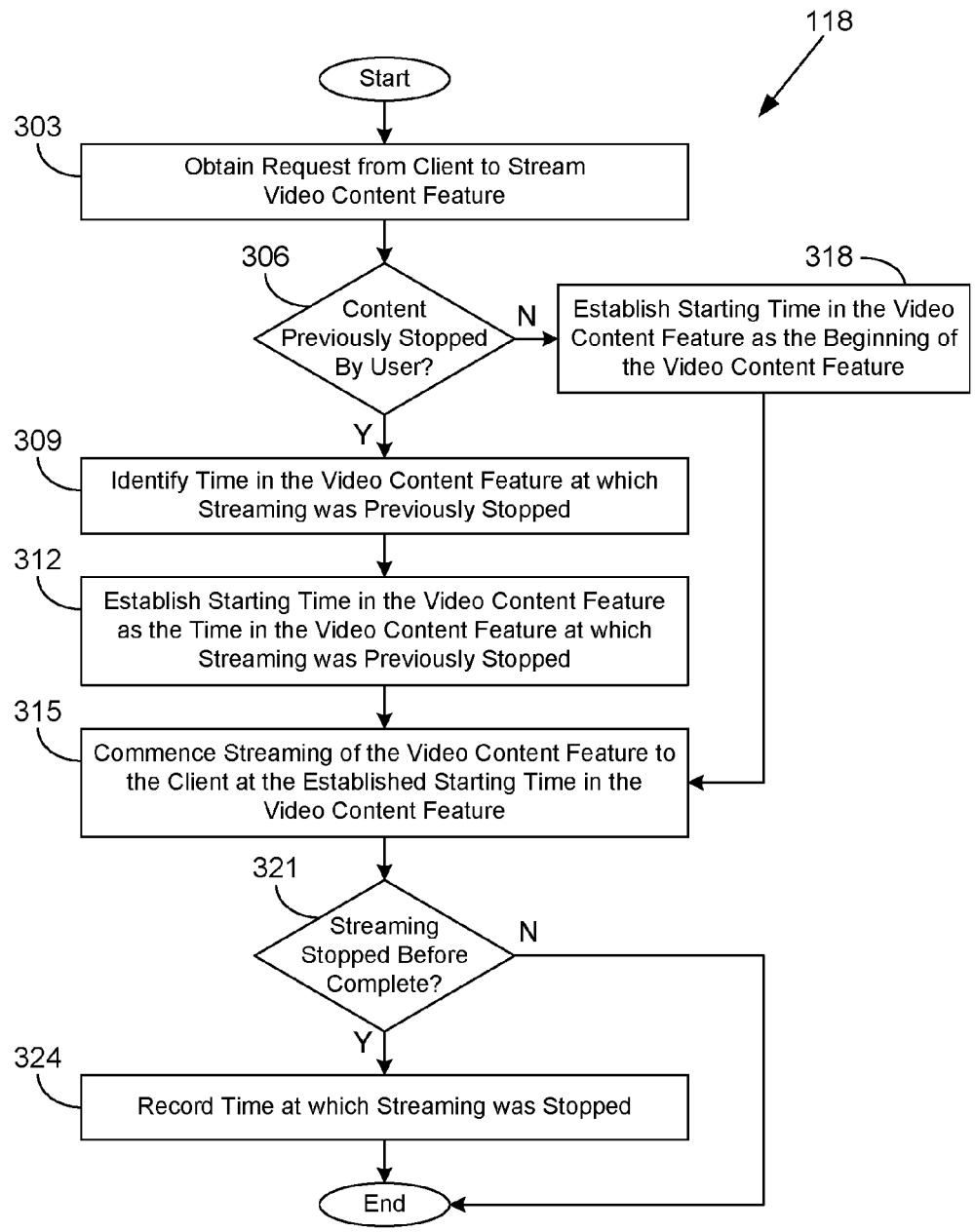
FIG. 3A is a flowchart illustrating one example of functionality implemented as portions of a content delivery service executed in a computing device in the networked environment of FIG. 1 according to various embodiments of the present disclosure.

Referring next to FIG. 3A, shown is a flowchart that provides one example of the operation of a portion of the content delivery service 118 according to various embodiments. It is understood that the flowchart of FIG. 3A provides merely an example of the many different types of functional arrangements that may be employed to implement the operation of the portion of the content delivery service 118 as described herein. As an alternative, the flowchart of FIG. 3A may be viewed as depicting an example method implemented in the computing device 103 (FIG. 1) according to one or more embodiments.

Beginning with box 303, the content delivery service 118 obtains a request from a client 106 (FIG. 1) to stream or otherwise download a video content feature 139 (FIG. 1). In box 306, the content delivery service 118 determines whether the video content feature 139 was previously stopped or paused by the user or otherwise interrupted. If the video content feature 139 was stopped, paused, or interrupted, the content delivery service 118 moves to box 309 and identifies a time in the video content feature 139 at which streaming was previously stopped. In box 312, the content delivery service 118 establishes a starting time in the video content feature 139 for the user as being the time in the video content feature 139 at which streaming was previously stopped. This time may be obtained from the respective resumption time 145 (FIG. 1) in the user data 130 (FIG. 1). The content delivery service 118 then continues to box 315.

If the content delivery service 118 instead determines in box 306 that the video content feature 139 was not previously stopped by the user, the content delivery service 118 moves from box 306 to box 318. In box 318, the content delivery service 118 establishes a starting time in the video content feature 139 for the user as being the beginning of the video content feature 139. The content delivery service 118 then proceeds to box 315.

In box 315, the content delivery service 118 commences streaming of the video content feature 139 to the client 106 at the established starting time in the video content feature 139. In box 321, the content delivery service 118 determines whether the streaming of the video content feature 139 has been stopped or otherwise interrupted before completion. If so, the content delivery service 118 continues to box 324 and records the time at which the streaming was stopped as a resumption time 145 in the user data 130 for the user. Thereafter, the portion of the content delivery service 118 ends. Although the flowchart of FIG. 3A shows the time at which streaming is stopped as being recorded in box 324, the time in the video content feature 139 may be continuously determined and recorded in other embodiments. If streaming has instead completed, the portion of the content delivery service 118 ends.

Figure 3B:
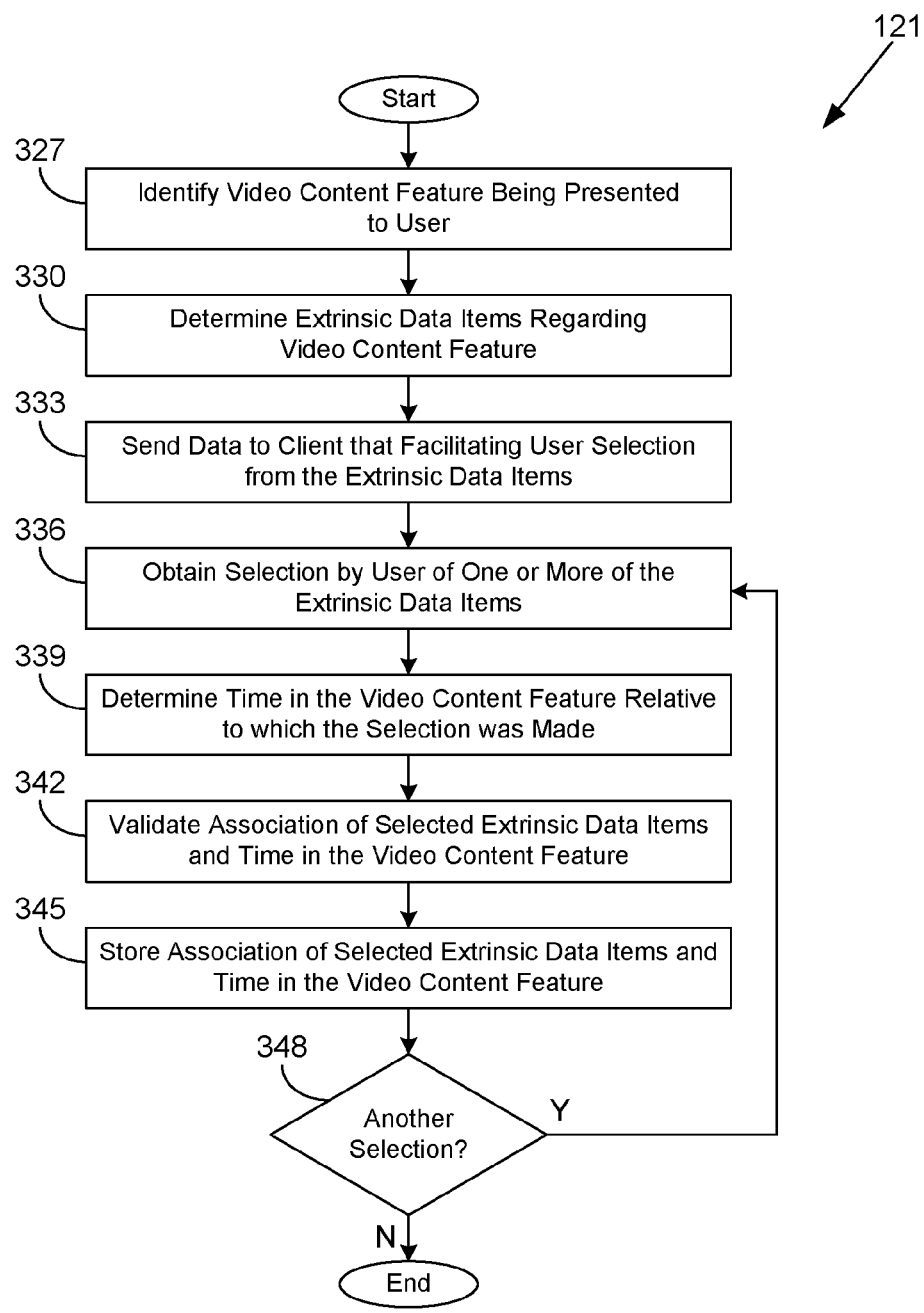
FIG. 3B is a flowchart illustrating one example of functionality implemented as portions of an extrinsic data association service executed in a computing device in the networked environment of FIG. 1 according to various embodiments of the present disclosure.

Turning now to FIG. 3B, shown is a flowchart that provides one example of the operation of a portion of the extrinsic data association service 121 according to various embodiments. It is understood that the flowchart of FIG. 3B provides merely an example of the many different types of functional arrangements that may be employed to implement the operation of the portion of the extrinsic data association service 121 as described herein. As an alternative, the flowchart of FIG. 3B may be viewed as depicting an example method implemented in the computing device 103 (FIG. 1) according to one or more embodiments.

Beginning with box 327, the extrinsic data association service 121 identifies a video content feature 139 (FIG. 1) that is being presented to a user. Such a video content feature 139 may be presented to the user via a content display device 112 (FIG. 1) or a client 106 (FIG. 1). The extrinsic data association service 121 may identify the video content feature 139 via communication with the content delivery service 118 (FIG. 1), if applicable, or the content enhancement application 163 (FIG. 1) executed in the client 106.

In some embodiments, the video content feature 139 may be directly identifiable by a unique identifier, title, dialogue, etc. In other embodiments, information such as user location, video content provider, etc. may be employed to narrow down the possibilities to ease identification of video content features 139. As a non-limiting example, knowledge of what movies are showing in a particular movie theater where the user is located (e.g., with location determined by global positioning system (GPS), etc.) may be used in determining the video content feature 139. As another non-limiting example, knowledge of what titles are currently being shown on channels of a cable television provider may be used in determining the video content feature 139.

In box 330, the extrinsic data association service 121 determines the extrinsic data items 148 (FIG. 1) in the extrinsic data library 136 (FIG. 1) regarding the video content feature 139. The extrinsic data items 148 that are determined may correspond to a subset of the extrinsic data items 148 that are associated with the video content feature 139, for example, a subset of the extrinsic data items 148 that are thought to pertain to a particular time or slice of time in the video content feature 139.

In box 333, the extrinsic data association service 121 sends data to the client 106 associated with the user that facilitates a user selection from the extrinsic data items 148 that were determined in box 330. In box 336, the extrinsic data association service 121 obtains a selection by the user of one or more of the extrinsic data items 148. In box 339, the extrinsic data association service 121 determines the time and/or video frame number in the video content feature 139 relative to which the user selection was made. To this end, a timecode or frame number may be sent to the extrinsic data association service 121 from the client 106 along with the selection. Alternatively, the extrinsic data association service 121 may communicate with the content delivery service 118 to determine the time associated with a streaming instance of the video content feature 139.

In box 342, the extrinsic data association service 121 validates the association of the selected extrinsic data items 148 and the time in the video content feature 139. To this end, the extrinsic data association service 121 may compare previous user associations to determine whether the current association is a statistical outlier. Also, the extrinsic data association service 121 may obtain feedback from other users to determine the validity of the current association. Further, the extrinsic data association service 121 may refer to a reputation score associated with the user to evaluate, at least in part, whether the current association is trustworthy.

Upon determining that the current association is valid, the extrinsic data association service 121 stores the association of the selected extrinsic data items 148 and the time in the video content feature 139 in box 345. The association may be stored as an extrinsic data-time association 151 (FIG. 1). In other embodiments, the extrinsic data-time association 151 may undergo asynchronous post-processing to determine validity. In box 348, the extrinsic data association service 121 determines whether the user makes another selection. If the user makes another selection, the extrinsic data association service 121 returns to box 336 and obtains the next selection. If the user does not make another selection, the portion of the extrinsic data association service 121 ends.

Figure 3C:
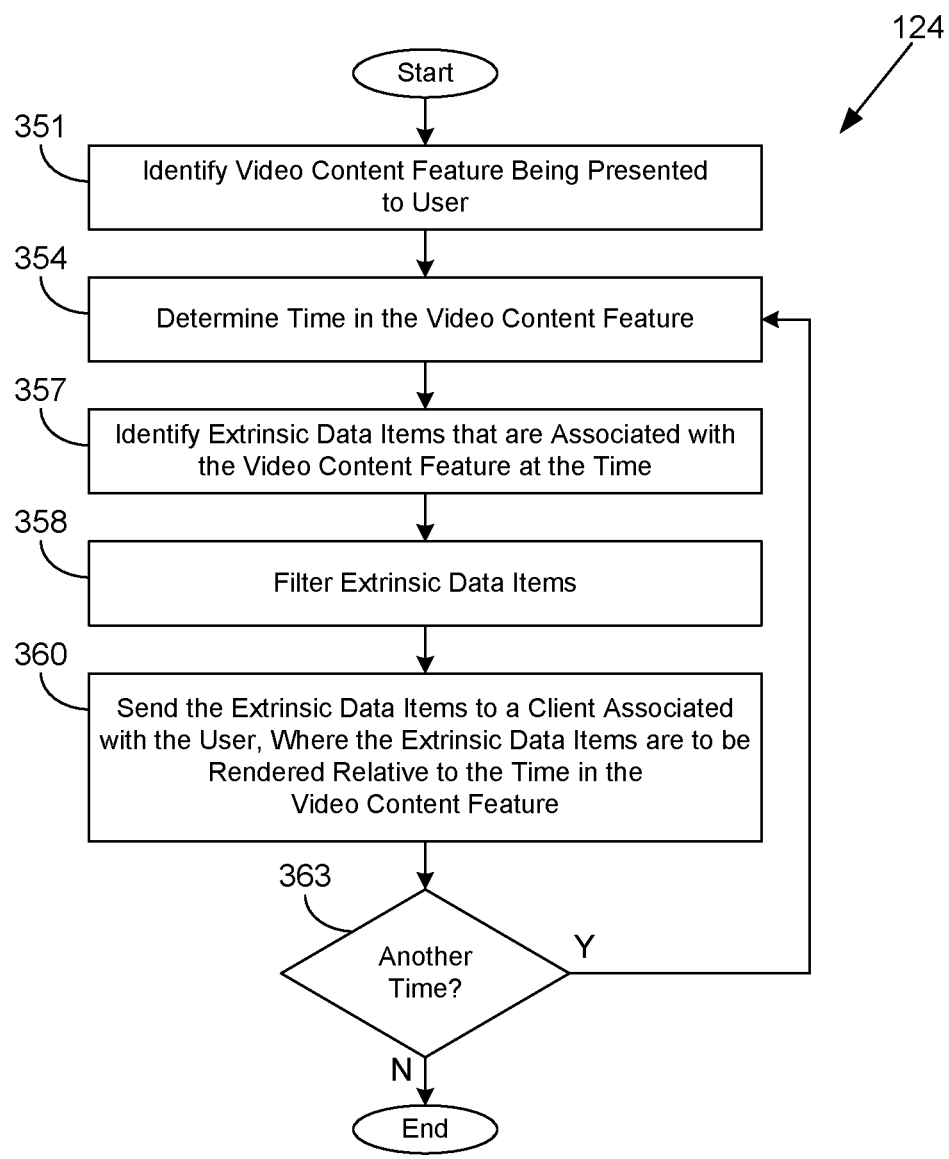
FIG. 3C is a flowchart illustrating one example of functionality implemented as portions of a content enhancement service executed in a computing device in the networked environment of FIG. 1 according to various embodiments of the present disclosure.

Moving on to FIG. 3C, shown is a flowchart that provides one example of the operation of a portion of the content enhancement service 124 according to various embodiments. It is understood that the flowchart of FIG. 3C provides merely an example of the many different types of functional arrangements that may be employed to implement the operation of the portion of the content enhancement service 124 as described herein. As an alternative, the flowchart of FIG. 3C may be viewed as depicting an example method implemented in the computing device 103 (FIG. 1) according to one or more embodiments.

Beginning with box 351, the content enhancement service 124 identifies a video content feature 139 (FIG. 1) that is being presented to the user. For example, the content enhancement service 124 may communicate with the content delivery service 118 (FIG. 1) or the content enhancement application 163 (FIG. 1) executed in a client 106 (FIG. 1) to determine the identity of the video content feature 136. In box 354, the content enhancement service 124 determines a current time in the video content feature 139.

In box 357, the content enhancement service 124 identifies extrinsic data items 148 (FIG. 1) in the extrinsic data library 136 (FIG. 1) that are associated with the video content feature 139 at the current time in the video content feature. The content enhancement service 124 may refer to the extrinsic data-time associations 151 (FIG. 1) to make this determination. Alternatively, the content enhancement service 124 may review the extrinsic data-time associations 151 and identify in advance at which times the extrinsic data items 148 are to be presented relative to the video content feature 139.

In box 358, the content enhancement service 124 may filter the extrinsic data items 148 that were identified in box 357. For example, it may be distracting or otherwise problematic to display too many of the extrinsic data items 148 at a certain time or during a scene of the video content feature 139. Accordingly, the content enhancement service 124 may be configured to filter the extrinsic data items 148 by relevance, popularity, and/or other criteria. Scores for the extrinsic data items 148 may be crowd-sourced in a similar manner to the extrinsic data-time associations 151 and validations thereof. Popularity, relevance, etc. may be determined explicitly by voting, implicitly by number of confirmations that an association is correct, and so on. In one embodiment, the extrinsic data items 148 are filtered to meet a predetermined threshold for relevance, which excludes the extrinsic data items 148 that do not meet the threshold. In some embodiments, the less relevant extrinsic data items 148 may be presented in an abbreviated or otherwise minimized format.

In box 360, the content enhancement service 124 sends the extrinsic data items 148 or a description thereof to a client 106 associated with the user. The extrinsic data items 148 are to be rendered by a content enhancement application 163 relative to the current time in the video content feature 139. For example, the content enhancement service 124 may show an extrinsic data item 148 that is associated with a point in time 15 minutes into a video content feature 139 exactly at 15 minutes, at 15 minutes, 30 seconds, or at some other time relative to the point of association so as to maintain a logical synchronization of the extrinsic data with the content.

In box 363, the content enhancement service 124 determines whether extrinsic data items 148 for another time in the video content feature 139 are to be processed. If so, the content enhancement service 124 returns to box 354 and determines the next time. If another time is not to be processed, the portion of the content enhancement service 124 ends. Although the content enhancement service 124 is described as processing times discretely, it is understood that the process may be continuous in some embodiments or prompted by pre-identified times that are associated with extrinsic data items 148.

Figure 4A:
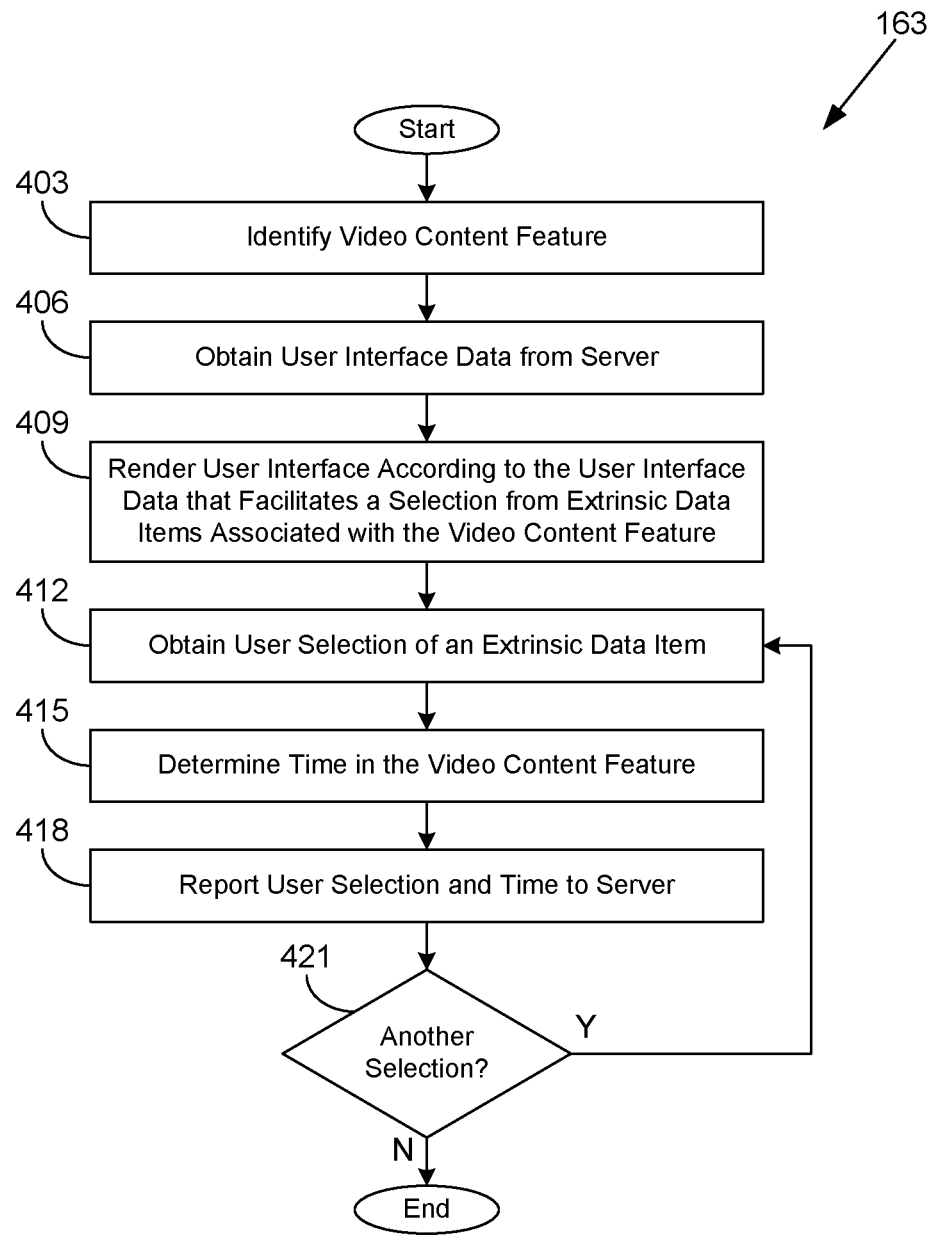
FIGS. 4A and 4B are flowcharts illustrating examples of functionality implemented as portions of a content enhancement application executed in a client in the networked environment of FIG. 1 according to various embodiments of the present disclosure.

Referring next to FIG. 4A, shown is a flowchart that provides one example of the operation of a portion of the content enhancement application 163 according to various embodiments. In particular, the portion of the content enhancement application 163 relates to user generation of extrinsic data-time associations 151 (FIG. 1). It is understood that the flowchart of FIG. 4A provides merely an example of the many different types of functional arrangements that may be employed to implement the operation of the portion of the content enhancement application 163 as described herein. As an alternative, the flowchart of FIG. 4A may be viewed as depicting an example method implemented in the client 106 (FIG. 1) according to one or more embodiments.

Beginning with box 403, the content enhancement application 163 identifies the video content feature 139 (FIG. 1) that is currently being presented to the user. The video content feature 139 may be presented to the user through a content access application 160 (FIG. 1) executed in the same client 106, a different client 106, or some other content access device 112 (FIG. 1). To this end, the content enhancement application 163 may identify the video content feature 139 via an application programming interface (API) of the content access application 160 or the content access device 112. In some embodiments, the content enhancement application 163 may identify the video content feature 139 in the physical environment surrounding the client 106 using audio fingerprinting or other techniques.

In box 406, the content enhancement application 163 obtains user interface data from the extrinsic data association service 121 (FIG. 1) over the network 109 (FIG. 1). In box 409, the content enhancement application 163 renders a user interface according to the user interface data. The user interface facilitates a user selection from a group of extrinsic data items 148 (FIG. 1) that are associated with the video content feature 139. For example, the group of extrinsic data items 148 may include all of the performers who appear in the video content feature 139, a selection of trivia items, a selection of goofs, and so on.

In box 412, the content enhancement application 163 obtains a user selection of one or more of the extrinsic data items 148. For example, the user may select a particular performer, trivia item, goof, etc. that is associated with the current scene or time in the video content feature 139. In box 415, the content enhancement application 163 determines the current time in the video content feature 139. The time may be determined through an API of the content access application 160, content access device 112, or through fingerprinting or another technique.

In box 418, the content enhancement application 163 reports the user selection and the time in the video content feature 139 that is associated with the user selection to the extrinsic data association service 121 over the network 109. The content enhancement application 163 may also report a graphical position to the extrinsic data association service 121. The graphical position, which may correspond to the user selection, is relative to a frame in the video content feature 139. In box 421, the content enhancement application 163 determines whether another selection is to be made. If another selection is to be made, the content enhancement application 163 returns to box 412 and obtains another selection of an extrinsic data item 148. In some cases, the content enhancement application 163 may obtain additional user interface data to facilitate a selection from a different set of extrinsic data items 148. If no other selection is to be made, the portion of the content enhancement application 163 ends.

Figure 4B:
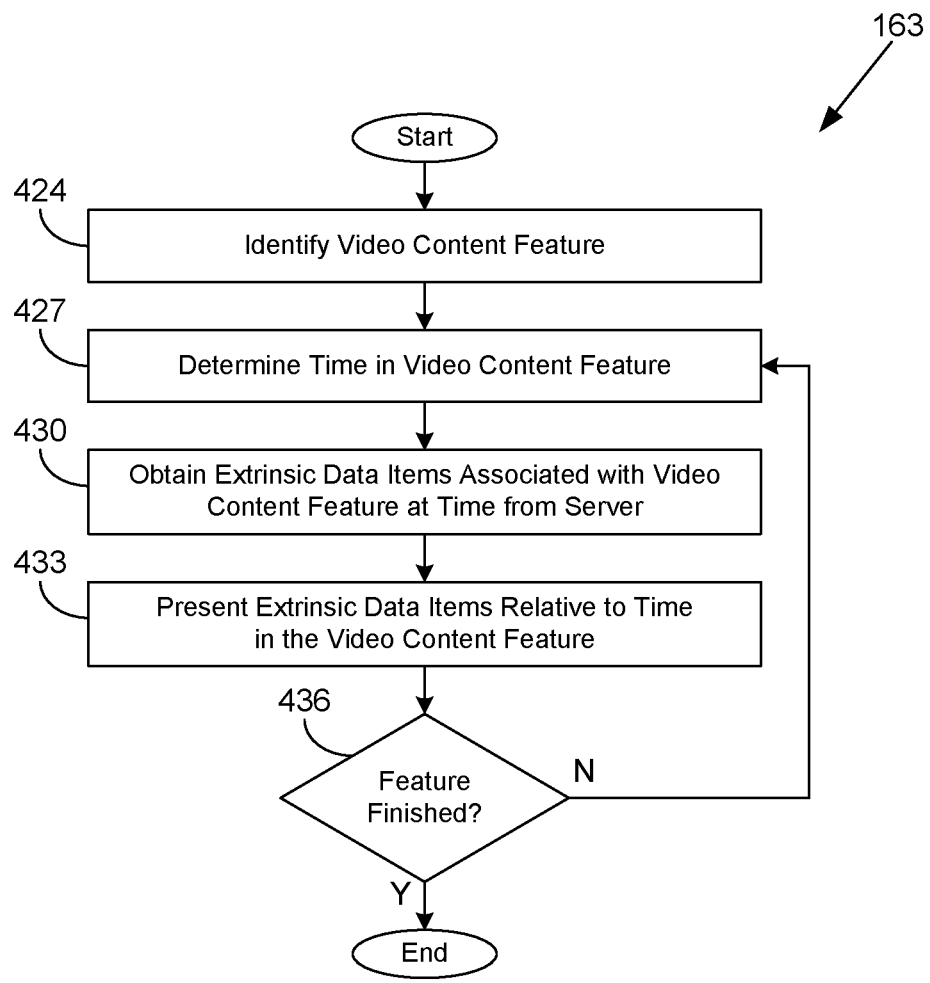

Continuing now to FIG. 4B, shown is a flowchart that provides one example of the operation of another portion of the content enhancement application 163 according to various embodiments. In particular, the other portion of the content enhancement application 163 relates to presentation of extrinsic data items 148 (FIG. 1) at appropriate times in conjunction with a video content feature 139 (FIG. 1). It is understood that the flowchart of FIG. 4B provides merely an example of the many different types of functional arrangements that may be employed to implement the operation of the other portion of the content enhancement application 163 as described herein. As an alternative, the flowchart of FIG. 4B may be viewed as depicting an example method implemented in the client 106 (FIG. 1) according to one or more embodiments.

Beginning with box 424, the content enhancement application 163 identifies a video content feature 139 that is being presented to the user through a content access application 160 (FIG. 1) or through a content access device 112 (FIG. 1). If the video content feature 139 is being presented through a content access application 160, the content access application 160 may be executed on the same client 106 or a different client 106 from the content enhancement application 163. In box 427, the content enhancement application 163 determines the current time in the video content feature 139.

In box 430, the content enhancement application 163 obtains extrinsic data items 148 that are associated with the video content feature 139 at the current time from the content enhancement service 124 (FIG. 1) over the network 109 (FIG. 1). In some cases, the content enhancement application 163 may obtain extrinsic data items 148 that are associated with the video content feature 139 at future times as well. In box 433, the content enhancement application 163 presents the extrinsic data items 148 that are associated with the current time (or time period) in the video content feature 139. Where the video content feature 139 is being rendered on the display 154 (FIG. 1) of the same client 106 as the content enhancement application 163, the extrinsic data item 148 may be rendered on top of, as an overlay, alongside, or otherwise in visual association with the rendered video content feature 139.

In box 436, the content enhancement application 163 determines whether the video content feature 139 has finished. If the video content feature 139 has not finished, the content enhancement application 163 returns to box 427 and determines another current time in the video content feature 139. Otherwise, if the video content feature 139 has finished, the portion of the content enhancement application 163 ends. Although the time comparison is described as being performed discretely for a time or range of time, it is understood that it may be performed continuously, potentially in anticipation of future times in the video content feature 139. Also, it may be that the content enhancement service 124 may push associated extrinsic data items 148 to the content enhancement application 163 in advance for an entire video content feature 139 or a portion of time in the video content feature 139.

Figure 5:
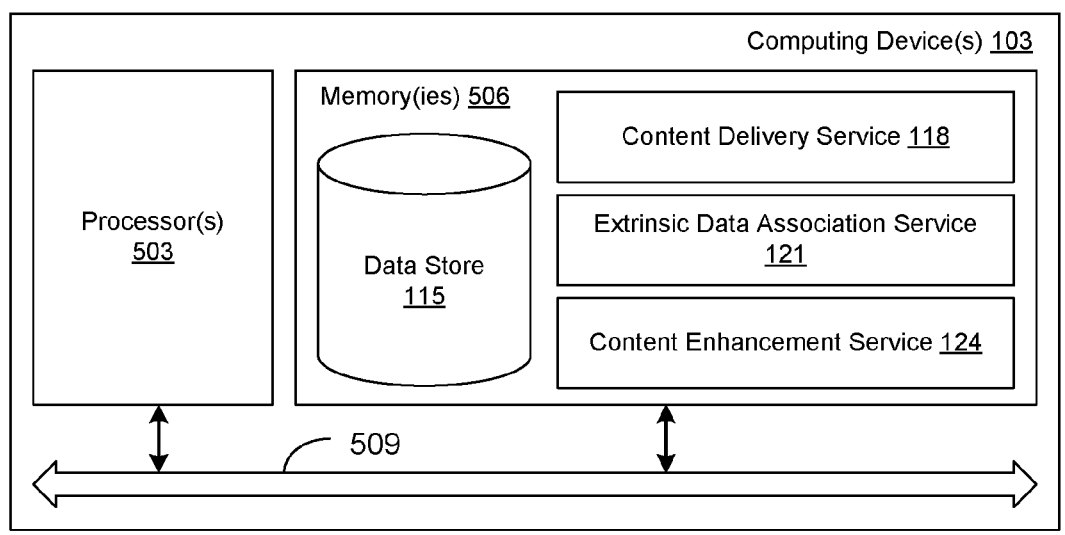
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the content delivery service 118, the extrinsic data association service 121, the content enhancement service 124, and potentially other applications. Also stored in the memory 506 may be a data store 115 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the content delivery service 118, the extrinsic data association service 121, the content enhancement service 124, the content access application 160 (FIG. 1), the content enhancement application 163 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3A-4B show the functionality and operation of an implementation of portions of the content delivery service 118, the extrinsic data association service 121, the content enhancement service 124, and the content enhancement application 163. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3A-4B show a specific order of execution, it is understood that the order of execution may differ from that which is depicted. For example, the order of execution of two or more blocks may be scrambled relative to the order shown. Also, two or more blocks shown in succession in FIGS. 3A-4B may be executed concurrently or with partial concurrence. Further, in some embodiments, one or more of the blocks shown in FIGS. 3A-4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 118, the extrinsic data association service 121, the content enhancement service 124, the content access application 160, and the content enhancement application 163, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    causing, via at least one of one or more computing devices, a user interface to be rendered that facilitates an entry of a corresponding score for at least one of a plurality of extrinsic data items that are associated with a video content feature that is currently being presented to a first user;
    receiving, via at least one of the one or more computing devices, the corresponding score of a particular extrinsic data item of the plurality of extrinsic data items through the user interface;
    determining, via at least one of the one or more computing devices, a time in the video content feature that is currently being presented to the first user; and
    causing, via at least one of the one or more computing devices, the particular extrinsic data item to be rendered on an electronic display at the time during another presentation of the video content feature to a second user based at least in part on the corresponding score.

2. The method of claim 1, further comprising determining, via at least one of the one or more computing devices, that the particular extrinsic data item meets a predetermined threshold for relevance based at least in part on the corresponding score.

3. The method of claim 1, further comprising determining, via at least one of the one or more computing devices, a popularity measure of the particular extrinsic data item based at least in part on the corresponding score.

4. The method of claim 1, further comprising determining, via at least one of the one or more computing devices, the time during the other presentation of the video content feature to the second user so as to maintain a logical synchronization of the particular extrinsic data item with the video content feature, wherein the time during the other presentation of the video content feature to the second user differs from the time in the video content feature presented to the first user.

5. A method, comprising:
    receiving, via at least one of one or more computing devices, a number of user selections of a particular extrinsic data item from a plurality of extrinsic data items relative to a specific time in a video content feature;
    determining, via at least one of the one or more computing devices, a measure of relevance for the particular extrinsic data item based at least in part on the number of user selections;
    determining, via at least one of the one or more computing devices, that the measure of relevance for the particular extrinsic data item meets a predetermined threshold for relevance; and
    causing, via at least one of the one or more computing devices, the particular extrinsic data item to be rendered on an electronic display at the specific time during a presentation of the video content feature based at least in part on the measure of relevance meeting the predetermined threshold for relevance.

6. The method of claim 5, wherein the particular extrinsic data item is rendered superimposed over the presentation of the video content feature on the electronic display.

7. The method of claim 5, further comprising determining, via at least one of the one or more computing devices, whether one or more of the number of user selections is a statistical outlier.

8. The method of claim 5, further comprising recording, via at least one of the one or more computing devices, an association between the particular extrinsic data item and the specific time in the video content feature based at least in part on the number of user selections.

9. The method of claim 5, wherein the number of user selections are received from a plurality of client devices associated with a plurality of users.

10. The method of claim 5, wherein the particular extrinsic data item is a trivia item.

11. The method of claim 5, wherein the particular extrinsic data item is a particular performer, the plurality of extrinsic data items are a plurality of performers associated with the video content feature, and individual ones of the number of user selections indicate that the particular performer appears in the video content feature at the specific time according to a corresponding user.

12. A system, comprising:
    at least one computing device; and
    at least one application executable in the at least one computing device, wherein when executed the at least one application causes the at least one computing device to at least:
        receive a number of user selections of a particular extrinsic data item from a plurality of extrinsic data items relative to a specific time in a video content feature;
        determine a measure of relevance for the particular extrinsic data item based at least in part on the number of user selections;

determine that the measure of relevance for the particular extrinsic data item meets a predetermined threshold for relevance; and cause the particular extrinsic data item to be rendered on an electronic display at the specific time during a presentation of the video content feature based at least in part on the measure of relevance meeting the predetermined threshold for relevance.

13. The system of claim 12, wherein the particular extrinsic data item is rendered superimposed over the presentation of the video content feature on the electronic display.

14. The system of claim 12, wherein when executed the at least one application further causes the at least one computing device to at least determine whether one or more of the number of user selections is a statistical outlier.

15. The system of claim 12, wherein when executed the at least one application further causes the at least one computing device to at least record an association between the particular extrinsic data item and the specific time in the video content feature based at least in part on the number of user selections.

16. The system of claim 12, wherein the number of user selections are received from a plurality of client devices associated with a plurality of users.

17. The system of claim 12, wherein the particular extrinsic data item is a trivia item.

18. The system of claim 12, wherein the particular extrinsic data item is a particular performer, the plurality of extrinsic data items are a plurality of performers associated with the video content feature, and individual ones of the number of user selections indicate that the particular performer appears in the video content feature at the specific time according to a corresponding user.

19. The method of claim 1, wherein the user interface and the video content feature are rendered on a single display device.

20. The method of claim 1, further comprising determining, via at least one of the one or more computing devices, whether the corresponding score is a statistical outlier.

* * * * *